United States Patent
Curran

[11] 3,904,170
[45] Sept. 9, 1975

[54] FLOW CONTROL VALVE
[75] Inventor: John R. Curran, Attleboro, Mass.
[73] Assignee: The Foxboro Company, Foxboro, Mass.
[22] Filed: Dec. 23, 1974
[21] Appl. No.: 535,622

[52] U.S. Cl. .................. 251/152; 251/163; 251/298
[51] Int. Cl.² ........................................ F16K 51/00
[58] Field of Search ........... 251/148, 152, 159, 162, 251/163, 298; 137/340

[56] References Cited
UNITED STATES PATENTS

| | | | |
|---|---|---|---|
| 2,756,017 | 7/1956 | Silverman | 251/148 |
| 2,883,147 | 4/1959 | Mirza | 251/159 X |
| 3,158,172 | 11/1964 | Giovannetti | 137/340 |

Primary Examiner—Harold W. Weakley
Attorney, Agent, or Firm—Frank J. Fleming

[57] ABSTRACT

A flow control valve in which a flow regulating member is pivotally mounted on the outside of a flow nozzle so that the pivots and coupling to the actuating means for moving the flow regulating member are located in the valve body out of contact with the main flowing stream of fluid and arranged so that the flow nozzle with the flow regulating member mounted thereon is removable as a unit from the valve body. The pivot for the regulating member is arranged so that the seating surface of the flow regulating member adjacent to the outlet end set of the flow nozzle remains out of contact with but in close proximity to the outlet end seat throughout the effective flow regulating stroke of the flow regulating member and makes sealing contact therewith at the shut-off end of the flow regulating stroke.

12 Claims, 5 Drawing Figures

# 3,904,170

FLOW CONTROL VALVE

BACKGROUND OF THE INVENTION

1. Field of the Invention

This invention relates to improvements in flow control valves for controlling the rate of flow of fluids. This invention is more particularly related to improvements in flow control valves of the type having a vane pivoted for movement across the discharge end of a flow nozzle as the means for regulating the rate of fluid flow.

2. Description of the Prior Art

This invention is in a crowded field of art. The patents cited herein are representative of the act in that field.

Miner U.S. Pat. No. 2,357,341 discloses a flow controller in which the flow regulating vane is mounted on the outside of a flow nozzle so that the pivots and actuating means are out of contact with the main flowing stream. Inasmuch as the flow regulating vane moves in close proximity with the outlet end of the nozzle but does not seat at the end of its stroke to provide a sealed shut-off condition, the machining tolerances are not as critical as those required for a flow regulating vane which must seat in a sealed shut-off condition. A major difference between the Miner flow controller and this invention is the arrangement of parts which enter into the removal of the regulating vane and flow nozzle as a unit. It is obvious that to remove the unit from the patented structure requires disassembling virtually the entire structure.

Zeigler et al. U.S. Pat. No. 3,191,906 and Ainsworth et al. U.S. Pat. No. 3,446,477 disclose flow control valves in which the flow regulating vane is mounted with the pivots on the valve body. Ainsworth adds a liner which isolates the pivots and vane mounting arms out of contact with the main flowing stream of fluid. It is obvious that neither patent discloses the flow regulating vane and flow nozzle arranged so as to be removed from the valve body as a unit. In addition, neither patents discloses a flow regulating vane moving out of contact with but in the close proximity to the outlet end of a nozzle with the sealing shut-off condition at the end of its stroke.

Mumma U.S. Pat. No. 3,494,589 and Baughmann U.S. Pat. No. 3,623,696 disclose valves in which the regulating vane is mounted on the valve body with the pivots and vane mounting arms in contact with the main flowing stream of fluid. It is obvious that neither patented valve disclose the combination found in the present invention. It is also obvious that the machining tolerances to achieve the out of contact movement of the flow regulating vane and sealing shut-off condition are much more difficult in the patented devices than in the flow control valve of the present invention. The patented valves are also subject to greater temperature problems with the pivots in the valve body and the flow regulating vane in the process fluid.

Bacchi U.S. Pat. No. 2,663,538, like the above mentioned Mumma and Baughmann patents, disclose movement of a flow regulating means that remains out of contact with but in close proximity to the valve seat throughout the effective flow regulating stroke and is moved into sealing contact with the regulating means at the shut-off end of the stroke. It is obvious that the Bacchi structure does not disclose the combination found in the present invention.

SUMMARY OF THE INVENTION

For a better understanding of the invention, the basic design consideration for a flow control valve are described, followed by a description of the invention in term of the selection and arrangement of parts which result in a combination which includes each of these design considerations.

The term "flow characteristic" of a valve as used herein means the change in the rate of flow of fluid through the valve for each incremental position of the flow regulating member. The flow characteristic is affected by the passage through the valve as well as by the shape and attitude of the flow regulating member. It is therefore a design consideration to reduce to a minimum the affect of the passage on the flow characteristic so that the flow characteristic is mainly a function of the shape and attitude of the curtain portion of flow regulating member. In order to meet this consideration, the flow passage should provide a substantially staight through flow path with a minimum of changes in the direction of the flow, especially inpingement of the flowing fluid on obsticles which produce turbulence.

Another design consideration is to reduce mechanical friction of the moving parts of the valve to a minimum so that the flow regulating member will be positioned accurately by the control component. In many industrial processes, it is necessary to use a valve which provides a positive, substantially leak-proof seal when the flow regulating member is in its fully closed position. In order to meet these considerations, the mechanical friction between the flow regulating member and the valve seat should be eliminated throughout the effective regulating stroke of the flow regulating member by maintaining its seating surface out of contact with but in close proximity to the valve seat.

A further design consideration is to reduce the probability of leaks through the operating shaft seals especially when the flow regulating member is in its fully-closed position. In the majority of industrial processes, the down-stream static pressure is less than the up-stream static pressure when the valve is fully closed. In order to meet this consideration, the shaft seals should be located down-stream of the valve seat.

Still another design consideration is to reduce to a minimum the effect of wide changes in the temperature of the valve on the ability of the flow regulating member to seat properly in its sealed fully-closed position. This consideration may be achieved by carefully considering the relative expansion and contraction of the parts which must accurately contact to provide the seal.

An important design consideration is to provide an arrangement and combination of parts and components that not only carries out each of the above objectives, but in addition, provides a structure from which critical parts and components are readily removed for service or substitution. In order to compete in the industrial process field, it is important that a valve can be serviced with a minimum down-time and at a minimum cost for labor and parts. It is also economically important for a customer to be able to transfer a valve from one process to another by merely substituting critical parts or components made of materials suitable for the new process.

Accordingly its the object of this invention to provide a flow control valve having its parts and components combined to achieve in a single structure all of the above discussed design considerations.

It is an important object of this invention to provide a flow control valve having a valve component which is readily removable from the valve body as a unit.

It is another object of this invention to provide such a flow control valve having an advantageous flow characteristic which is mainly a function of the shape and attitude of the curtain portion of the flow regulating member.

It is still another object of this invention to provide a flow control valve which has its parts arranged in a manner which is economical to machine to the tolerance required for the friction free movement of the flow regulating member out of contact with but in close proximity to the seat and provide sealing contact at the fully closed end of its stroke.

It is a further object of this invention to provide a flow control valve having its parts arranged to minimize the affect of temperature changes on the sealing of the flow regulating member against the seat in its fully-closed position.

It is still a further object of this invention to provide a flow control valve having the arrangement of parts to minimize leakage through the shaft seal when the flow regulating member is in its fully-closed position.

Yet another object of this invention is to provide a flow control valve having a redundant sealing means.

The objects of this invention are achieved by the novel selection and arrangement of the parts and components of the flow control valve.

An advantageous flow characteristic is achieved by using a flow nozzle in tandem with recovery members which provides a substantially straight through flow path. The flow nozzle and recovery sections may be shaped to minimize the affect of the flow passage on the flow characteristics of the valve. The flow regulating member is mounted on pivots located on the external surface of the flow nozzle so that the pivots and arms of the flow regulating member and coupling means for actuating the flow regulating member are all out of the main stream of flowing fluid. This combination and arrangement removes all parts of the valve except the curtain portion of the flow regulating member from regions in which inpingement or change of direction of the main stream might produce turbulence which would affect the flow characteristic of the valve.

In this invention, the outlet end of the flow nozzle serves as the valve seat which is contacted by the seating surface of the flow regulating member in its fully closed position to provide a positive substantially leakproof seal. Mechanical friction between the seat and flow regulating member is eliminated throughout the effective regulating stroke of the flow regulating member by locating the axis of the pivot means off-set with respect to the axis of the seat. The amount of off-set is chosen to maintain the surface of the flow regulating member adjacent to the seat out of contact with the seat but in the close proximity thereto. By maintaining the close proximity between the flow regulating member and the seat, the flow of fluid therebetween caused by the deflection of the main stream against the surface of the flow regulating member is minimized.

An important feature of this invention is the combination of the flow nozzle with the flow regulating member mounted thereon to provide a valve component which is readily removable from the valve body. This feature is achieved by including on the body a journal member through which the actuating shaft extends to couple with the flow regulating member. By using a coupling means, the shaft may be withdrawn to disconnect the flow regulating member so that the valve component may be removed from the valve body. The valve component may be assembled to the valve body with the shaft withdrawn and then made operable by moving the shaft inwardly to couple with the flow regulating member.

The removable valve component has many important advantages. The commercial advantages such as its ready removal for service or substitution have been mentioned hereinabove. Another important advantage is that the arrangement of parts is economical to manufacture to the tolerances required to insure the sealing contact between the flow regulating member and the seat. By locating the pivot holes on the external surface of the flow nozzle and the seat on the outlet end, the machining of the critical relationship is simplified. The accumulation of errors in dimension between the mounting surfaces of the valve component and valve body and the location and alignment of the shaft for coupling with the flow regulating member are not critical to the sealing contact between the flow regulating member and the seat on the outlet end of the flow nozzle.

In addition to the economy of the manufacture, the arrangement of parts minimizes the affect of changes in temperature of the process fluid on the ability of the flow regulating member to seat properly in seated relation with the seat on the outlet end of the flow nozzle. In this invention, the flow nozzle and the flow regulating member are immersed in the process fluid. As a consequence, both parts are maintained at the same temperature. Inasmuch as the critical dimension of the two parts is identical, the expansion contraction of the parts will be identical so that the sealing relationship is maintained. It should be noted that the valve body is exposed internally to the process fluid and externally to atmosphere so that it is not maintained at the same temperature as the parts completely immersed in the process fluid.

BRIEF DESCRIPTION OF THE DRAWINGS

The invention will be more readily understood from a reading of the specifications and by reference to the accompanying drawings.

DESCRIPTION OF THE PREFERRED EMBODIMENT

Figure 1:
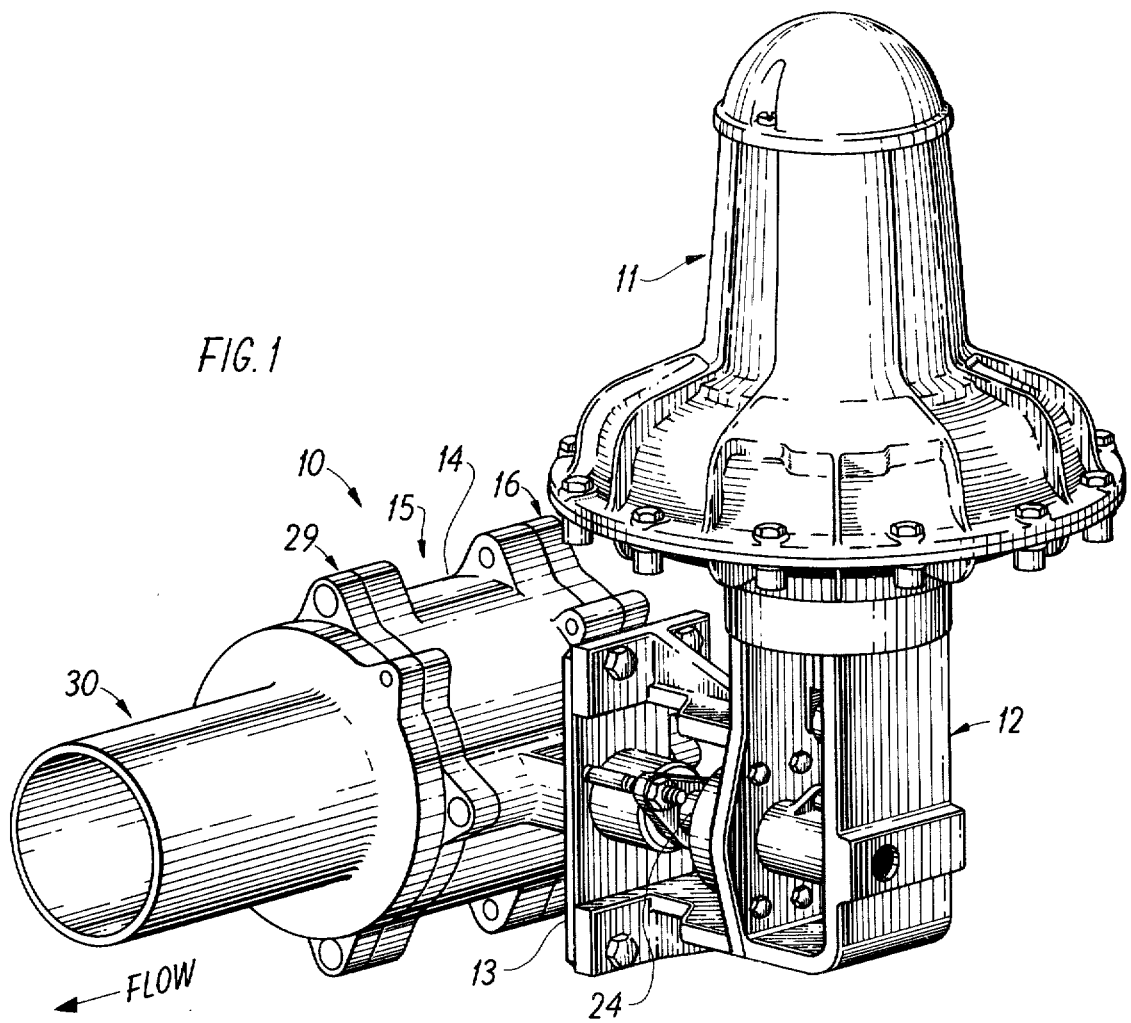
FIG. 1 is an overall view of the flow control valve of this invention shown with the power operating means mounted thereon.

Referring to FIG. 1, the flow control valve 10 of this invention is shown assembled, with a pneumatic actuator 11 mounted thereon, in condition to be mounted in a flow line between a pair of pipe flanges (not shown). The flow control valve 10 includes a body assembly 15, valve component 16 and optional accessories, including an adapter-diffuser 29 and a diffuser 30. The pneumatic actuator 11 is well known and an example of a typical one is fully disclosed in U.S. Pat. No. 2,536,000 issued to H. L. Bowditch on Dec. 25, 1950. The yoke 12 of the pneumatic actuator 11 is adapted to be attached to a mounting surface 13 located on the body 14 of the body assembly 15. In FIG. 1, only the exterior of the pneumatic actuator 11 is shown. It is understood that a linkage system (not fully shown) transmits the motion of the diaphragm of the pneumatic actuator 11 to rotate shaft 24 of the body assembly 15 through the necessary angle to regulate the rate of flow of fluid through the flow control valve 16.

Figure 2:
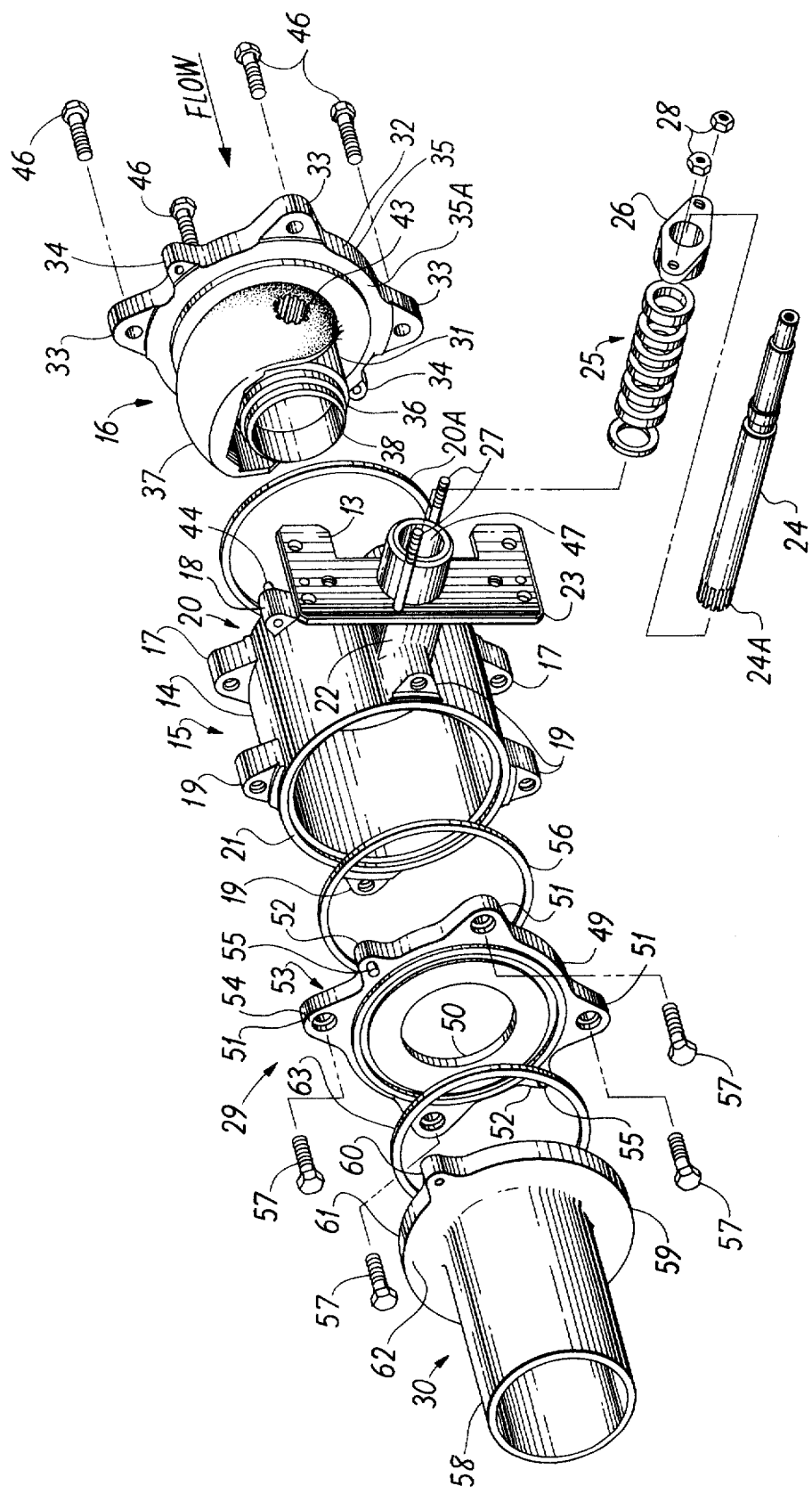
FIG. 2 is an exploded view of the valve separated into its components.

Referring to FIG. 2, the flow control valve 10 is shown with its components separated to better illustrate the advantages derived from this invention. The body assembly 15 is the basic unit to which the valve component 16, adapter-diffuser 29, diffuser 30 and pneumatic actuator 11 are mounted. Preferably the flow control valve 10 is mounted in the flow line (not shown) with the fluid flowing from right to left as indicated by the arrow marked FLOW. The body 14 of the body assembly 15 is preferably a cylindrical tube having mounting lugs 17 and aligning lugs 18 extending radially outward at the upstream end thereof and mounting lugs 19 extending radially outward at the downstream end thereof. The surface 20 of the upstream end of the body 14, including the surfaces mounting lugs 17 and aligning lugs 18, and the surface 21 of the downstream end of the body 14, including the surfaces mounting lugs 19, are machined for sealing engagement with surfaces identified later herein of the valve component 16 and adapter-diffuser 29 respectively. A boss 22 extends radially outward from body 14 to provide a journal 47 for shaft 24. Space is provided in the journal 47 for packing 25. A mounting plate 23 is rigidly attached to boss 22 with studs 27 extending outwardly therefrom. A collar 26 is held in place with shaft 24 extending therethrough by studs 27 and nuts 28 and may be adjusted to compress packing 25 the necessary amount to prevent leakage of fluid around the shaft 24 while permitting the shaft 24 to move satisfactorily during normal operation.

In FIG. 2, the valve component 16 is shown removed as a unit from the body assembly 15. The construction of the valve component 16 is shown in more detail in FIG. 3, and the cross section thereof is shown in FIG. 4. The body 31 of the valve component has preferably a nozzle shaped internal configuration 31a which is aligned axially with the axis of the flow line in which the flow control valve is mounted. The body 31 has a flange 32 extending radially outward at its upstream end. The flange 32 includes mounting lugs 33 and aligning lugs 34. The upstream surface 35 and downstream surface 35a of the flange 32 and lugs 33 and aligning lugs 34 are machined for sealing engagement with the flange of the flow line (not shown) and the surface 20 of the body 14 respectively. Holes 40 are bored in the outer surface of the body 31 in bosses 39 which provide the additional thickness of material for sufficient hole depth without penetrating entirely therethrough. Holes 40 are located in an upstream direction from the discharge end 36 of body 31. The discharge end 36 may be shaped to provide a spherical seat or may be machined to receive a seat ring 38. Details of a redundant seat ring will be described later herein with reference to FIG. 5. The flow regulating member 36 is generally U-shaped with the arm 37a and 37b acting as support arms for the curtain 37c. An accurate hole 42 is machined to arm 37a and an accurate splined hole 43 is machined in arm 36b. The concave spherical seat 37d is accurately machined in curtain 37c with respect to holes 42 and 43. To insure a substantially leak-proof seal, the seat 37d is lapped with the flow regulating member 37 mounted in a fixture with pins through holes 42 and 43. The seating surface of the seat ring 38 is also lapped in a manner which will be described later herein. To assemble the valve component 16, the flow regulating member 37 is placed over the end 36 of the body 31 with the holes 40, 42 and 43 axially aligned and bearing pins 41 are set in place in holes 41. The valve component 16 is now ready to be installed as a unit on the body 14 of the body assembly 15.

To install valve component 16 on body assembly 15, the discharge end on which is mounted the flow regulating member 37 is inserted in the body 14 and the gasket 20a between the surface 20 of the body 14 and the surface 35a of the body 31. The valve component 16 is angularly aligned with the body assembly so that alignment pin 44 in aligning lug 18 of the body assembly 15 engages the hole 34a of the valve component 16. Then bolts 46 are used in mounting lugs 17 and 33 to secure the valve component 16 in sealed relation with body assembly 15. The shaft 24 is moved inwardly in journal 47 so that the splined end 24a engages with the splined hole 43 of the flow regulating member 37. The splined end 24a also includes a concentric hole which fits over pin 41 to align the flow regulating member 37 so that it pivots accurately about pins 41. To remove valve component 18, the shaft 24 is withdrawn and the bolts 46 removed.

The flow control valve 10 may be used with the valve component 16 installed on the body assembly 15, by installing it between the flanges of the flow line (not shown). The mounting lugs 17 and 33 and aligning lugs 18 and 34 are axially spaced so as to avoid interference with the spacing of the bolt holes in standard pipe flanges. When flow control valve 10 is installed in a flow line, the axis A of the internal configuration 31a is aligned with the axis of the flow line. The axis B of holes 40 in the body 31 of the valve component 16 is located off-set from axis A an amount which results in moving the flow regulating member 37 throughout its regulating stroke with the seat 37d out of contact with but in the close proximity to the surface of seat ring 38. At the end of the regulating stroke, the seat 37d is moved into sealing contact with the surface of seat ring 38.

The alignment of axis A of the internal configuration 31a of the body 31 with the axis of the flow line provides a substantially straight through flow path. The adapter-diffuser 29 and diffuser 30 may be added to the flow control valve 10 thus far described to enhance the downstream flow recovery. Referring to FIGS. 2 and 4, the adapter-diffuser 29 has preferably a disc shaped body 49 with a contoured central opening 50. The body 49 may include an upstream extending liner 49a shaped to protect the body 14 from impingement of the fluid discharging from the valve component that is deflected by the upstream surface of flow regulating member 37.

At the outer edge of body 49 an upstream surface 53 and a downstream surface 54 are machined for sealing engagement with other surfaces. The upstream and downstream surfaces 53 and 54 include the surface of mounting lugs 51 and aligning lugs 52 extending radially on the body. The adapter-diffuser 29 is mounted on the flow control valve 10 with its upstream surface 21 of the body 14 with gasket 56 interposed therebetween and held firmly in place by bolts 57 inserted in the holes in mounting lugs 19 and 51. The mounting lugs 53 and aligning lugs 54 are also axially spaced to avoid interference with the spacing of the bolt holes in standard pipe flanges. The flow control valve 10 as thus far described as including the body assembly 15, the valve component 16 and adapter-diffuser 19 is installed between the flanges of a flow line (not shown). When the adapter-diffuser 29 is mounted on flow control valve 10, the contoured central opening 50 is alilgned with the axis A of the internal configuration 31a to provide a continuation of the substantially straight through flow path.

Continuing to refer to FIGS. 2 and 4, the body 58 of the diffuser 30 preferably has an internal configuration 30a of the recovery section of a venturi tube. Accessories (not shown) for enhancing the flow recovery or reducing noise may be mounted in the diffuser 30. The body 58 terminates at its upstream end with a flange 59 which includes alignment lugs 60 extending radially therefrom. The upstream surface 61 and downstream surface 62 of the flange 59 are machined for sealing engagement with other surfaces. The diffuser 30 is not attached to the body assembly 15 as are the valve component 16 and adapter-diffuser 29. It it were so attached, it would be impossible to insert the flow control valve 10 between the stationary pipe flanges of the flow line. Instead, diffuser 30 is inserted into the flow line; then the flow control valve 10, which includes the body assembly 15, valve component 16 and adapter-diffuser 29 is moved into place with the upstream surface 61 of the diffuser 30 abutting downstream surface 54 of the adapter-diffuser 29 with gasket 63 interposed therebetween and with the aligning pin 55 in the hole in the aligning lug 60. Then the bolts (not shown) are inserted through the holes in the pipe flanges of the flow line and tightened to clamp the entire unit in the flow line. Gaskets (not shown) are used for sealing the joints at the pipe flanges. AS in the case of the other lugs, the aligning lugs 60 of the diffuser 30 also avoid interference with the spacing of the bolt holes in standard pipe flanges. When the diffuser 30 is mounted as described above, the internal configuration 30a is aligned with the axis A of the internal configuration 31a and contoured central opening 50 to provide a continuation of the substantially straight through flow path.

Figure 5:
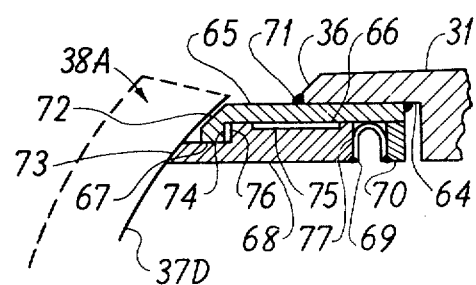
FIG. 5 is an enlarged view of the redundant sealing seat ring insert.
Figure 3:
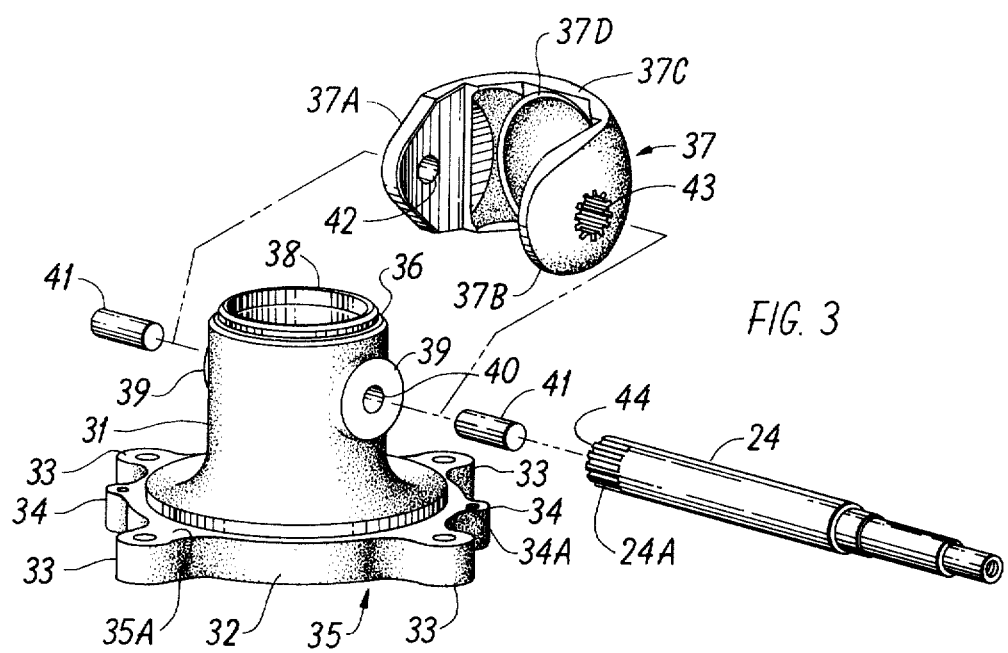
FIG. 3 is an exploded view of the removable valve component.
Figure 4:
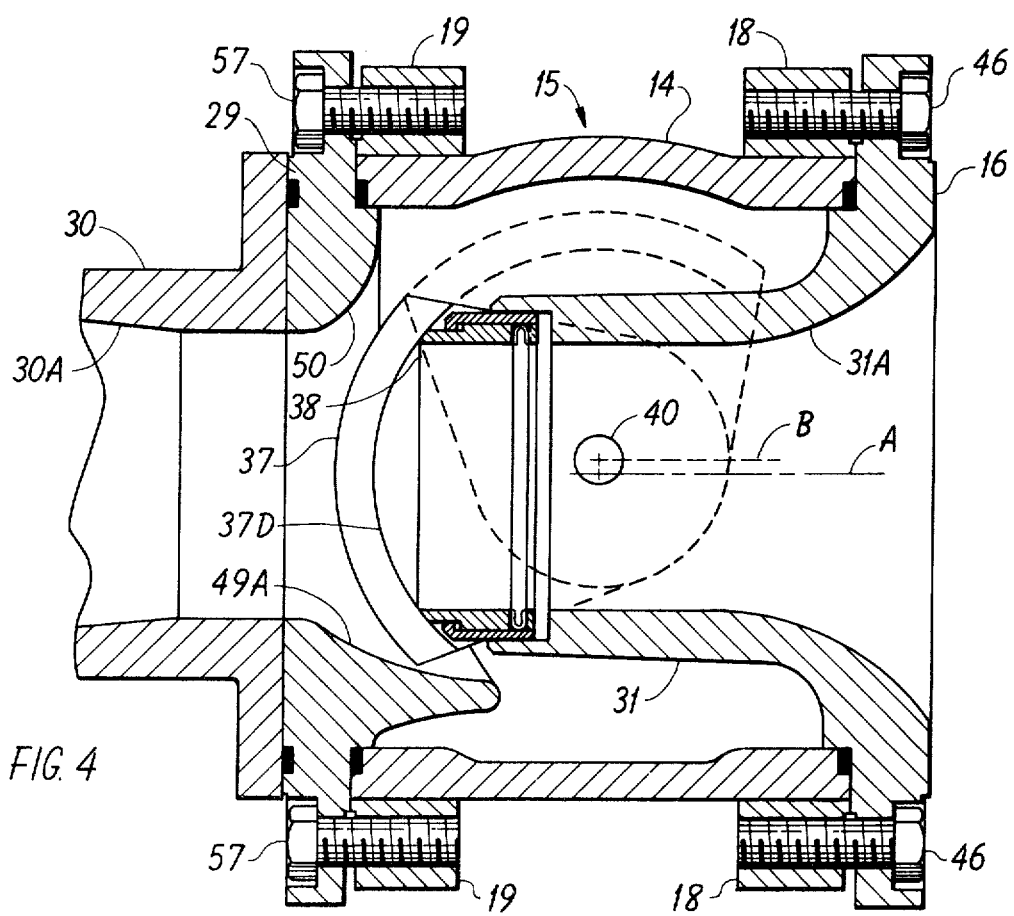
FIG. 4 is a cross-section of the valve showing the alignment of the parts making up the flow path through the valve and also showing the off-set pivot feature.

Referring to FIG. 5, a cross-section of a preferable embodiment 38a of the seat ring 38 of FIG. 3 is disclosed. A stationary outer seat ring 65 has a reduced inside diameter bearing section 66 with a shoulder 74. A movable inner seat ring 68 has an enlarged outer diameter bearing section 75 with a shoulder 76. The bearing section 75 is in a sliding engagement with the bearing section 66 of the stationary outer seat ring 65 and positioned so the shoulders 74 and 76 may abut each other. The seating surfaces 72 and 73 of the stationary outer seat ring 65 and the movable inner seat ring 68 are lapped to a spherical shape in a fixture with a shim in the order of 0.005 inch thick placed between the abutting shoulders 74 and 76. After the lapping operating, the shim is removed and the U-shaped annulus spring 69 with its open side facing inwardly is slipped into the bearing section 66 of the stationary outer seat ring 65 with one leg of the U in contact with the shoulder 77 of the movable inner seat ring 68. U-shaped spring 69 is welded to ring 70 and to shoulder 77 of movable seat ring 68. Then the movable seat ring 68, U-shaped spring 69 and ring 70 are fitted into the section 66 and pressed to preload the U-shaped spring 69, and the ring 70 is then welded in place. The seat ring 38a is then pressed into the recessed section 64 of the downstrean end 36 of the body 31 to locate the seating surface 72 a predetermined distance from the axis of the holes 40 in the body 31 and is welded at 71.

In operation, the seat ring 38a provides redundant seat rings 65 and 68. As the flow regulating member 37 is moved to its closed position, the seat 37d first contacts the seat 73 of the movable inner seat ring 38, pushing its longitudinally upstream until the seat 37d contacts the seat 72 of the stationary outer seat ring. The seats 37d and 72 provide the principal sealing of the flow control valve 10 and the second or redundant seat 73 is held against the seat 37d by the compression of spring 69. With the flow regulating member 37 thus closed, as the pressure of the fluid acting on the U-shaped spring 69 is increased, the normal force of the spring 69 acting on the movable inner seat ring 68 is also increased, thus improving the seal between the seats 37d and 73.

In operating, the position of the flow regulating member 37 is a function of the amplitude of the pressure of a pneumatic pressure signal acting on the diaphragm of pneumatic actuator 11. The pneumatic pressure signals commonly have an operating range between 3 and 15 psi To insure the accurate movement of the flow regulating member 37 to the position called for by the pneumatic pressure signal, all unnecessary friction must be eliminated. This is accomplished to the present invention by the off-set axis B which eliminates the contact between the seat 38 and seating surface 37d throughtout the flow regulating stroke of the flow regulating member 37.

As can be appreciated by a review of the "Summary of the Invention" appearing earlier herein, that the objects of this invention are carried out.

What is claimed is:

1. A flow control valve for installation in a flow line to regulate the rate of flow of process fluids therethrough comprising, in combination:

a valve component comprising;
   a nozzle having a flow passage therethrough with an inlet end and an outlet end and mounting means at the inlet end thereof,
   pivot means mounted externally on said nozzle with the axis thereof perpendicular to the axis of the flow passage of said nozzle at a predetermined distance from the outlet end of said flow passage, and
   a flow regulating member mounted on said pivot means for movement across the outlet end of the flow passage of said nozzle and adapted to regulate the rate of flow of fluid through said flow passage and having coupling means axially aligned with said pivot means;

a body having;

a central passage therethrough with an inlet end and an outlet end, mounting means at the inlet end of said central passage, and a journal means, a shaft having coupling means at one end thereof;

said valve component being adapted to be inserted in the central passage of said body with the mounting means of said valve component abutting the mounting means of said body, means for removably attaching the mounting means of said valve component to the mounting means of said body, the journal means of said body being adapted to receive said shafts and located so that when said shaft is inserted therein the coupling means of said shaft is aligned with and coupled to the coupling means of the flow regulating member of said valve component whereby said flow regulating means moves with movement of shaft.

2. The flow control valve in accordance with claim 1 wherein;

the outlet end of the flow passage of said nozzle terminates in a seat, and the surface of said flow regulating member facing said seat is adapted to mate in sealing contact therewith.

3. The flow control valve in accordance with claim 2, wherein;

said surface and said seat are spherical in shape.

4. The flow control valve in accordance with claim 2, wherein;

said seat comprises a ring attached to said nozzle.

5. The flow control valve in accordance with claim 2, wherein;

the axis of the pivot means of said nozzle is offset with respect to the axis of the seat at the outlet end of the flow passage of said nozzle whereby as the flow regulating member moves between its open and closed positions, said surface adjacent to said seat is maintained out of contact with said seat but in close proximity thereto and at the closed position movement of said flow regulating means is stopped as said surface makes contact with said seat.

6. The flow control valve is accordance with claim 1, wherein;

the flow passage of said nozzle has a characterized configuration.

7. The flow control valve in accordance with claim 1, in which said combination includes;

an adapter-diffuser having a flow passage therethrough and mounting means, said body having mounting means at the outlet end of said central passage, means for removably attaching the mounting means of said adapter-diffuser to the mounting means of said body, said adapter-diffuser, its mounting means and the mounting means on said body at the outlet end of said central passage being located so that when said adapter-diffuser is attached to said body the axis of the flow passage of said adapter-diffuser is axially aligned with the flow passage of the nozzle of the valve component.

8. The flow control valve in accordance with claim 7, wherein;

the flow passage in said adapter-diffuser has a characterized configuration.

9. The flow control valve in accordance with claim 7, in which said combination includes;

a diffuser having a flow passage therethrough and mounting means at its upstream end, said diffuser being adapted to be inserted in said flow line with said mounting means abutting the mounting means of said adapter diffuser, said diffuser, its mounting means and the mounting means of said adapter-diffuser being located so that when the mounting means of said diffuser abuts the mounting means of said adapter-diffuser, the axis of the flow passage of said diffuser is axially aligned with the flow passage of said adapter-diffuser.

10. The flow control valve in accordance with claim 8, in wherein;

the flow passage in said diffuser has a characterized configuration.

11. The flow control valve in accordance with claim 5, wherein;

said seat comprises, a stationary seat ring having a seating surface and a bearing surface, a movable seat ring having a seating surface and a bearing surface, said stationary seat ring and said movable seat ring being adapted so the bearing surface of said stationary seat ring is in sliding engagement with the bearing surface of said movable seat ring with the seating surface of said movable seat ring projecting a small distance axially beyond the seating surface of said stationary seat ring, and spring loading means biasing said movable seat ring towards the seating surface of said stationary seat ring, whereby as said flow regulating means moves to its closed position, the surface thereof first contacts the seating surface of said movable seat ring, pushing said movable seating axially until the surface of said flow regulating member contacts the seating surface of said stationary seat ring.

12. The flow control valve in accordance with claim 11, wherein;

said spring loading means is an annulus U-shaped ring having the opening of the U-shaped ring facing inwardly whereby the pressure of the process fluid acts on the exposed surfaces of said U-shaped ring to increase the biasing of said spring loading means with increases in said pressure.

* * * * *